United States Patent

[11] 3,572,644

[72] Inventor Pierre Poncet
12 bis, Rue Trarieux, Lyon, France
[21] Appl. No. 823,689
[22] Filed May 12, 1969
[45] Patented Mar. 30, 1971

[54] APPARATUS FOR EXPOSING A PULVERULENT PASTY OR LIQUID MATERIAL TO THE ACTION OF A CONTROLLED ATMOSPHERE
12 Claims, 11 Drawing Figs.

[52] U.S. Cl. .................................................. 259/6
[51] Int. Cl. ................................................. B01f 7/08
[50] Field of Search .................................... 259/5, 6, 21, 40, 41, 64, 102, 103, 104

[56] References Cited
UNITED STATES PATENTS
3,244,408  4/1966  Brownlie .................... 259/6
3,349,725  10/1967 Bini ............................ 259/6
3,421,740  1/1969  Behrens ...................... 259/6

Primary Examiner—Robert W. Jenkins
Attorney—Alexander & Dowell

ABSTRACT: The apparatus comprises a main conveyor screw which rotates within a main bore having at least one lateral slot which communicates with an exposing chamber. The latter is maintained under vacuum or receives a treating gas. A returning conveyor screw rotates in a bore situated below the exposing chamber and which communicates with the main bore and with the exposing chamber in order to return into the former the material which may have been thrown into the latter by the main screw. The material is introduced into the main bore by a feed device, as for instance a feed screw, so arranged as to form an airtight seal isolating the main bore from the outer atmosphere. In the same manner the material treated is withdrawn from the main bore by an outlet device also forming an airtight seal. More particularly in the case of pasty or plastified materials the airtight seal may be obtained by increasing the diameter of the core of the screws in order to compress the material in the form of a plug between the successive turns.

Patented March 30, 1971 3,572,644

INVENTOR.
Pierre Pouet
BY
Alexander Nowak
attorneys

Patented March 30, 1971

INVENTOR
Pierre Poncet
BY Alexander Powell
Attorneys

Patented March 30, 1971

INVENTOR.
Pierre Poncet
BY
Alexander Farrell
Attorneys

APPARATUS FOR EXPOSING A PULVERULENT PASTY OR LIQUID MATERIAL TO THE ACTION OF A CONTROLLED ATMOSPHERE

BACKGROUND OF THE INVENTION

The present invention relates to an apparatus to expose a pulverulent, pasty or liquid material to the action of a controlled atmosphere and more particularly of vacuum. Such an apparatus may be used for degassing plastic substances in an injection or an extrusion machine, for eliminating volatile components from a divided material, for the treatment of a substance by a gas, etc.

SUMMARY OF THE INVENTION

The apparatus according to the present invention comprises a main conveyor screw rotating in a substantially horizontal main bore which communicates laterally with an exposing chamber, a feed device supplying the material to be treated to a first end of the main bore while isolating the latter from the outer atmosphere, an outlet device withdrawing the material from the second end of the main bore while also isolating the latter from the outer atmosphere, and a returning screw rotating in a substantially horizontal bore disposed below the exposing chamber and which communicates laterally with the said chamber and with the main bore so as to return into the latter the material being treated which has passed from the said main bore into the exposing chamber or into the bore of the said returning screw.

More particularly when the material is to be submitted to the action of vacuum, the communication between the main bore, the exposing chamber and the bore of the returning screw is preferably in the form of an elongated slot extending along a substantial portion of the length of the main bore. The returning screw may then propel the material in the reverse direction with respect to the main screw so as to realize a recycling effect. In the case of a gas the exposing chamber may be in the form of two spaces respectively communicating with one and the other end of the main bore the gas being supplied to one of these spaces so as to circulate along the main bore and to issue therefrom through the other space.

DESCRIPTION OF THE PREFERRED EMBODIMENTS

Figure 1:
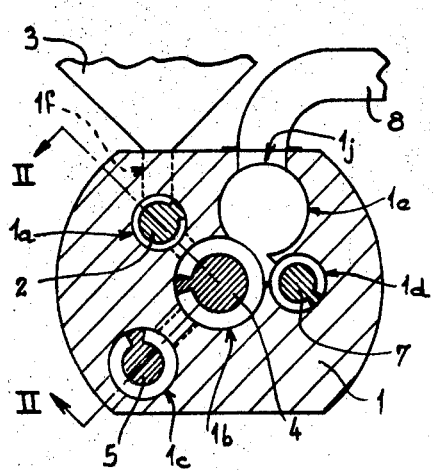
FIG. 1 is a transverse section of a first embodiment of an apparatus according to the invention for the treatment of a thermoplastic material by vacuum.
Figure 2:
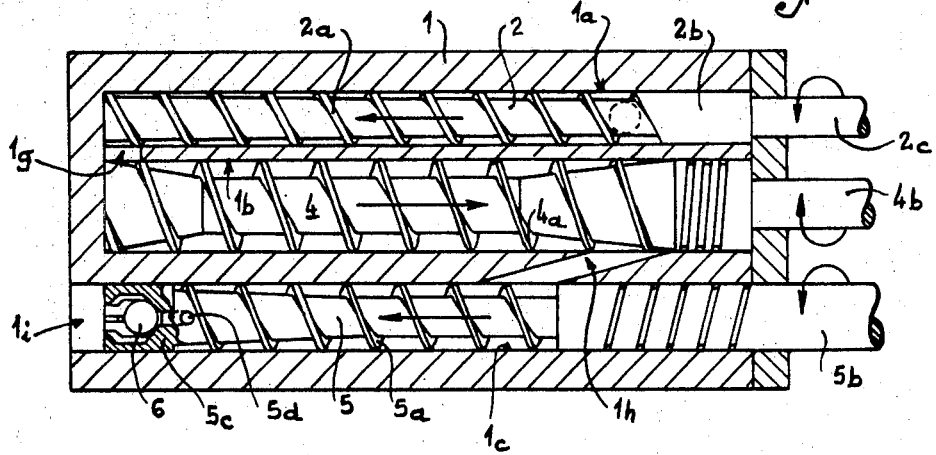
FIG. 2 is a longitudinal section taken along line II—II of FIG. 1.

Referring to FIGS. 1 and 2 the apparatus comprises a massive body 1 formed with five substantially parallel bores, respectively 1a, 1b, 1c, 1d and 1e. As illustrated bore 1b which has the largest diameter, is disposed axially with respect to body 1, bore 1a and 1c being situated respectively above and below bore 1a and on the same side of the vertical axial plane of body 1, while bores 1d and 1e are disposed close to each other and to bore 1b on the other side of the said plane, bore 1d having its axis substantially in the horizontal axial plane of body 1 and bore 1e being situated above that plane.

A feed screw 2 (FIG. 2) is rotatably mounted in bore 1a. Starting from the right, the core of this screw comprises a diverging frustoconical section and a cylindrical section. This core supports a screw thread 2a of uniform pitch but of varying radial height, having an outer diameter substantially equal to the diameter of bore 1a. Screw 2 extends towards the right in the form of a solid cylindrical portion 2b also having a diameter substantially equal to the diameter of bore 1a. This portion 2b is integral with a driving shaft 2c.

Body 1 is formed with a substantially vertical radial canal 1f which opens downwardly into bore 1a in the vicinity of the right end of screw 2 in FIG. 2. The upper or outer end of this canal 1f is connected with an appropriate hopper such as diagrammatically illustrated at 3. The left end of bore 1a communicates with bore 1b through a transverse canal 1g.

Another conveyor screw or main degassing screw 4, is rotatably mounted in the larger bore or main bore 1b. Starting from the right in FIG. 2, the core of this screw comprises a converging frustoconical portion followed by a cylindrical portion, and finally a diverging frustoconical portion. This core carries a screw thread 4a of uniform pitch, but of varying radial depth and having an outer diameter substantially equal to the diameter of bore 1b. Screw 4 extends outwardly in the form of a cylindrical portion having substantially the same diameter as bore 1b so as to rotate therein with a quite small clearance, this portion being integral with an outer shaft 4b mechanically connected with an appropriate driving gearing, not shown. As illustrated the cylindrical portion may be formed with a helical groove in order to prevent any leakage of the material treated.

An inclined canal 1h starts from the right end of the main bore 1b and opens into bore 1c. The left end of this bore 1c forms the outlet 1i of the apparatus. In the embodiment illustrated this outlet is adapted to receive an injection nozzle (not illustrated) having a spring-loaded valve in the conventional manner.

An outlet screw 5 is rotatably disposed within bore 1c. The core of this screw comprises, starting from the right in FIG. 2, a cylindrical section and a diverging frustoconical section the larger diameter of which is however smaller than the diameter of bore 1c. This core carries a screw thread 5a of uniform pitch but of varying radial height, and having an outer diameter substantially equal to the diameter of bore 1c. The core of screw 5 extends toward the right in the form of a rod or shaft 5b having substantially the same diameter as bore 1c, which may be rotated by an appropriate gearing (not shown) and axially displaced as for instance by means of a hydraulic ram in a per se known manner. Shaft 5b may for instance comprise a fluted portion slidable through the grooved bore of a driving gear, while its end is rotatably connected with the piston of the ram.

The left end of the core of screw 5 carries a cylindrical head 5c which acts as a piston within bore 1c. This head is formed with an inner chamber in which is disposed a ball valve 6'. This chamber opens on the free end of head 5c and it communicates with a radial conduit 5d provided in the diverging frustoconical section of the core of screw 5, close to the larger base thereof. Ball 6 only permits passage of the treated material from screw 5 towards outlet 1i. As usual in such valves, ball 6 is centered by longitudinal ribs which only leave it a limited longitudinal freedom.

As illustrated in FIG. 1 bores 1b, 1d and 1e are laterally connected with each other by an elongated longitudinal passage or slot which extends along a substantial portion of their length.

A returning screw 7 is rotatably disposed within bore 1d. This screw comprises a cylindrical core with a screw thread of uniform height and of constant pitch. As illustrated in FIG. 1 screw 7 is disposed close to the degassing screw 4. As screws 2 and 4, screw 7 extends outwardly on the right side of the apparatus in FIG. 2 in the form of a shaft connected with an appropriate driving gearing, not illustrated.

As to bore 1e, it forms a vacuum chamber void of any conveyor screw and for this purpose it is connected through a conduit 8 with an appropriate source of vacuum, not shown.

In operation a thermoplastic material loaded in hopper 3 is conveyed towards the left in FIG. 2 by the feed screw 2 which is rotated in the proper direction, as indicated by the arrows. The apparatus being maintained at a proper temperature by heating means, not illustrated, the material is plastified and owing to the progressive increase of the diameter of the core of the screw in the final frustoconical section thereof, it is highly compressed in the form of a gastight plug between the turns of screw 2 and the wall of bore 1a. The compressed material flows through canal 1g into the main bore 1b.

The degassing screw 4 conveys the material from the left end of bore 1b to the right end thereof. In the portion wherein the core of the screw is cylindrical, the material is no more compressed owing to the increase of the volume comprised between two successive turns of the screw thread 5a. It is therefore highly stirred and all its particles are successively exposed to the action of vacuum through the lateral slot which connects bores 1b and 1e with each other.

The material propelled by screw 4 is again compressed in the left-hand portion thereof owing to the frustoconical shape of the core and it flows into bore 1c through canal 1h.

During the longitudinal displacement of the material in the main bore 1b, a fraction thereof leaves the corresponding screw 4 in the zone corresponding to the lateral slot which connects bores 1b and 1e with each other. This fraction falls into bore 1d and it is conveyed by screw 7 towards the left end of the apparatus where it is finally recycled into bore 1b. This recycling enhances the homogeneity of the material when the latter comprises a mixture of components. MOreover the fraction recycled by screw 7 is exposed to vacuum during a longer time.

The material forced by the main screw 4 into bore 1c is propelled towards the left by the outlet screw 5. It passes through canal 5d and through head 5c. The valve of the injection nozzle (not illustrated) adapted to outlet 1i being closed by its loading spring, this material accumulates and pushes screw 5 towards the right in FIG. 2, the controlling valve of the hydraulic ram which actuates longitudinally shaft 5b being set to the position which permits free contraction of the ram. When the quantity of plastified material thus accumulated between the injection nozzle and head 65c is deemed sufficient, the hydraulic ram is actuated so as to return screw 5 towards the right. The flow of material from left to right bring prevented by ball 6, head 5c acts as an injection piston in a per se known manner. The material under high pressure opens the spring-loaded valve of the injection nozzle and fills the molding cavity of the mold against which this nozzle is applied.

In a modified embodiment the apparatus may comprise two outlet screws acting in alternate succession, one receiving the plastified material from screw 4 while the other one injects into a mold the charge of plastified material previously received.

In another modification screw 5 is retained axially at a fixed position and an extrusion nozzle is adapted to outlet 1i, the treated material being continuously forced through this nozzle under the action of screw 5.

In any case the compression of the plastified material at both ends of the main screw 4 forms an airtight seal which prevents any air ingress into the vacuum chamber or bore 1e.

The apparatus of FIGS. 1 and 2 may be used for the treatment of pulverulent materials. In such a case the seal at both ends of screw 4 is not perfect, but nevertheless the negative pressure maintained in bore 1a may be quite high. If the material treated is neither to be injected, nor to be extruded, the outlet 1i may be left open.

The apparatus of FIGS. 1 and 2 may also be used for the treatment of liquids. In such a case the main screw 4 is preferably rotated at a high speed in order that the liquid may be maintained against the wall of the main bore 1b. The inlet and the outlet of the liquid may be effected by means of rotary valves or pumps.

When screw 4 rotates at a high speed, a substantial fraction of the material is thrown into bore 1e. If this material is liable to stick to the wall of said bore, the latter may be provided with a rotary scraper.

Figure 3:
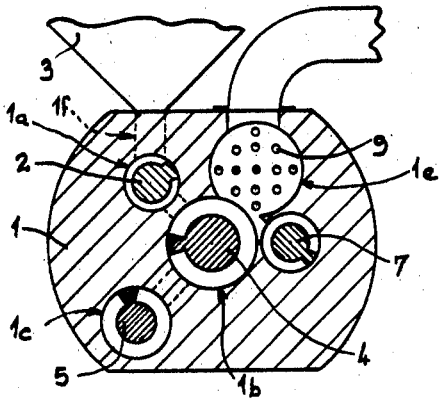
FIGS. 3 to 7 are transverse sections illustrating modified embodiments of an apparatus according to the invention.

FIG. 3 shows an embodiment wherein cooling tubes 9 have been disposed within bore 1e in order to condense volatile components evolved by the material treated. The wall of bore 1b or the core of screw 4 may then be heated to promote vaporization of these components. If the condensed component is a liquid, the apparatus may be slightly inclined in order that this liquid may be collected at one end of bore 1d.

Figure 4:
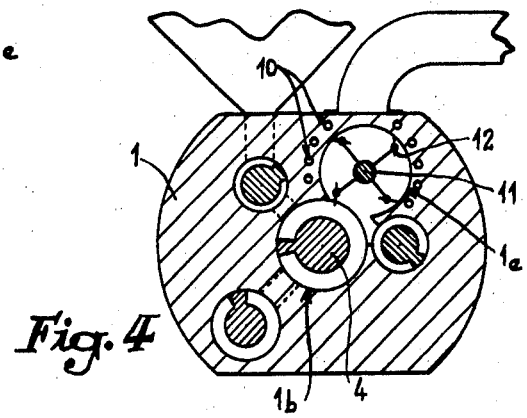

In the modification of FIG. 4 the cooling fluid flows through canals 10 provided in body 1 around bore 1e. Condensation of the volatile components thus takes place on the wall of this bore and if the condensed product has a tendency to stick to the wall, bore 1e may be equipped with a rotary scraping device comprising for instance a shaft 1 carrying scraping blades 12.

Figure 5:
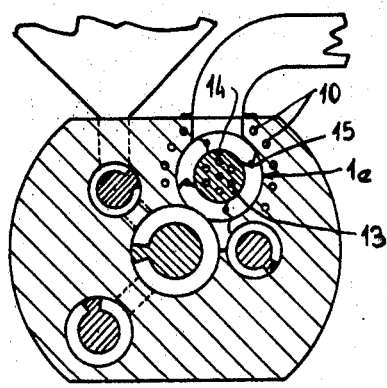

FIG. 5 illustrates an arrangement in which an elongated cylindrical member 13 is axially disposed within bore 1e, this member being formed with longitudinal canals 14 for the circulation of a cooling fluid. The scraping device comprises double blades 15 which rotate in the annular space between member 13 and the wall of bore 1e. These blades may be carried by longitudinal rods supported by a rotating plate disposed at one end of bore 1e, member 13 being only supported by its end remote from the rotating plate and the latter being of course carried by an appropriate shaft.

The advantage of the embodiment of FIG. 5 is that if bore 1b is heated either by heating means or by the material treated, this has no influence on the cooling effect of member 13, while with the arrangement of FIG. 4 some heat barrier should be provided in body 1 between bores 1b and 1e if it is desired to avoid heat losses by conduction.

Figure 6:
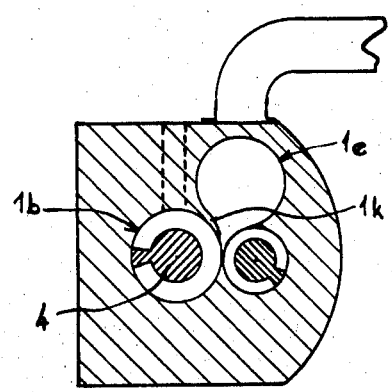

FIG. 6 illustrates an embodiment particularly adapted to the treatment of liquids, with screw 4 rotating at a high speed, as above indicated. A lip 1k extends between bores 1b and 1e in order to prevent or to minimize liquid projections into bore 1e under the action of centrifugal force. The liquid expelled from bore 1b collects in bore 1d and is recycled by screw 7. The embodiment of FIG. 6 comprises no feed screw and no outlet screw, the liquid being fed into the apparatus and extracted therefrom by rotary valves or pumps, as above indicated.

Figure 7:
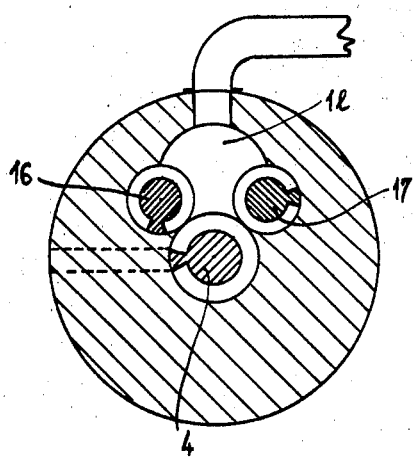

In the modification of FIG. 7 the vacuum chamber is no more in the form of a bore, but of a relatively wide inner space 1l disposed above the main bore 1b and which communicates freely therewith. The apparatus comprises two returning screws 16 and 17 situated on one and the other side of this space or chamber, close to bore 1b.

Figure 8:
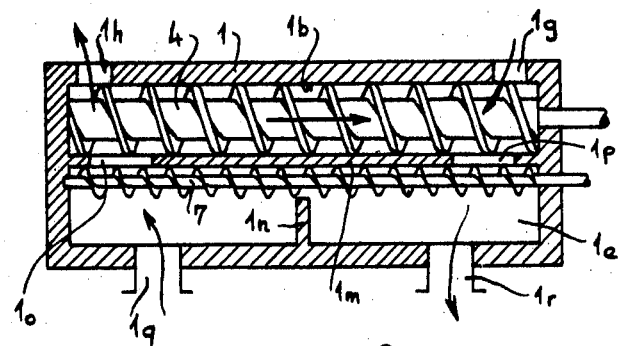
FIG. 8 is a very diagrammatical illustration of an embodiment for the treatment of a material by a gas.

It has hitherto been supposed that the apparatus was used for exposing a material to the action of vacuum. But it may also be applied for submitting a material to the action of a gas. However a difficulty then arises owing to the fact that the gas which then fills bore 1e is not renewed and does not circulate in contact with the material being treated. This may be avoided by means of the embodiment illustrated in FIG. 8. In this FIG., which corresponds to a section by the plane defined by the axes of bores 1b and 1e, the main screw 4 has been illustrated with a cylindrical core for the sake of simplicity and also because a gastight seal at both ends of this screw is here of lesser importance if the treating gas is itself under a pressure substantially equal to the outer atmospheric pressure. Also the feed screw and the outlet screw have been omitted for the sake of simplicity. A longitudinal partition 1m is interposed between the main bore 1b and bore 1e which may be described in this case as the gas chamber. Bore 1e is divided into two individual spaces by a transverse partition 1n. The longitudinal partition 1m has an opening adjacent each end, namely 1o and 1p. The gas is supplied through an inlet nozzle 1q into the left-hand portion or elementary space of bore 1e and it leaves the apparatus through an outlet nozzle 1r provided in the right-hand portion of the said bore. It therefore flows from left to right through the main bore 1b, as indicated by the arrow, in contact with the material stirred and propelled by screw 4 in the reverse direction between inlet canal 1g and outlet canal 1h. Of course the feed of material to screw 4 should be such that the space defined between the successive turns thereof are only partially filled.

The returning screw 7 cooperates with the openings 1o and 1p in such manner as to recycle through the latter the material which has passed through the former from bore 1b into bore 1e. It will be seen that a fraction of the treating gas flows through the turns of screw 7 which therefore acts as a short circuit for the main screw 4, but owing to the small diameter of screw 7, this is of minor importance. Furthermore the gas which flows through screw 7 acts on the material recycled by the latter and is not therefore entirely lost.

Figure 9:
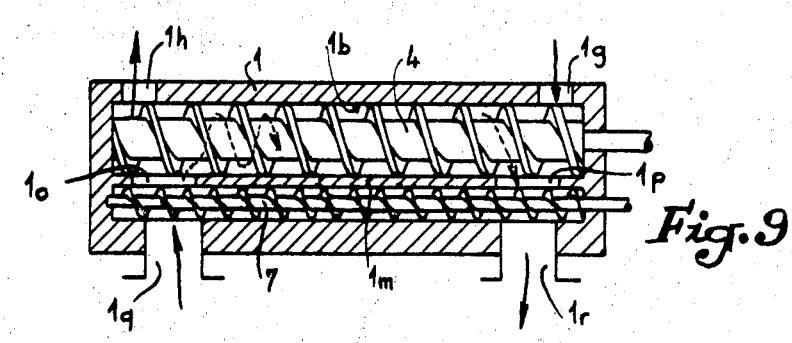
FIGS. 9 to 11 illustrate three modifications of the apparatus of FIG. 8.

In the modification of FIG. 9 bore 1e has been suppressed and the inlet and outlet nozzles 1q and 1r open directly in front of openings 1o and 1p of the longitudinal partition 1m. It is obvious that the operation of the apparatus remains unchanged, but its dimensions may be reduced with respect to the case of FIG. 8.

Figure 10:
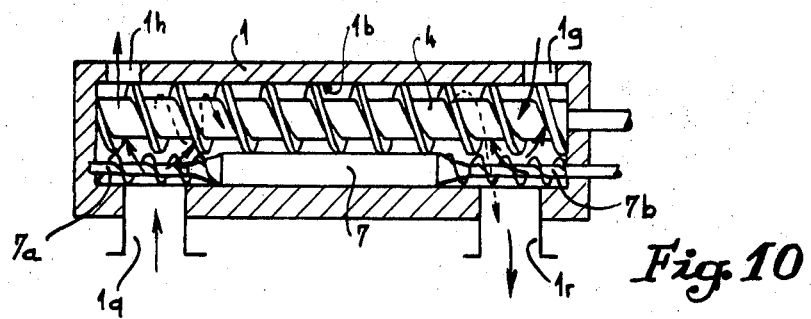

FIG. 10 illustrates a further modification wherein the returning screw 7 has a plain central portion and two screw-threaded end portions. The inlet and outlet nozzles 1q and 1r are thus no more partially short-circuited by screw 7 and the longitudinal partition 1m of FIGS. 8 and 9 may be dispensed with, the plain portion of screw 7 playing its role. However the material is no more recycled from the left end of screw 4 to the right end thereof, the terminal screw-threaded portions of screw 7 only returning into bore 1b the material which would otherwise tend to clog the gas passage.

Figure 11:
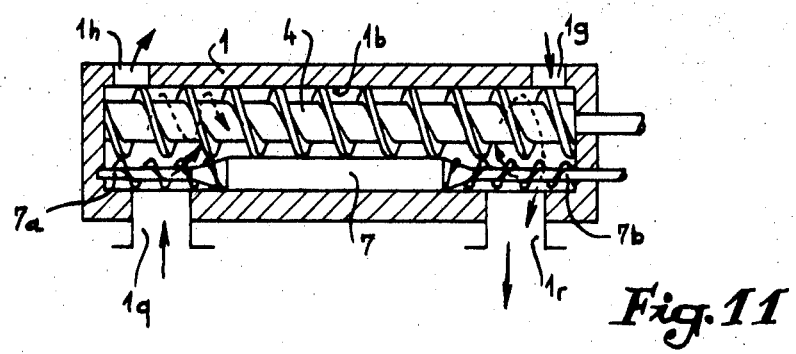

In FIG. 10 both screw-threaded portions of screw 7 are in the same direction and the screw is rotated so as to propel the material towards the left. In the modification of FIG. 11 these screw-threaded portions are of opposed pitch, but in both cases the screw 7 returns into bore 1b the material which would otherwise clog nozzles 1q and 1r.

It is to be noted that in the embodiment of FIGS. 1 and 2 the terminal frustoconical portions of the core of the main screw 4 may often be dispensed with, the said core being cylindrical along its whole length. The airtight seal required for the operation is then realized at the left end of the feed screw 2 and at the right end of the outlet screw 5.

I claim:

1. An apparatus for exposing a pulverulent, pasty or liquid material to the action of a controlled atmosphere and more particularly of vacuum, comprising:
   a body having a substantially horizontal main bore with a first end and a second end, an exposing chamber communicating laterally with said main bore, and a substantially horizontal returning bore in lateral communication with said exposing chamber and said main bore to receive from said exposing chamber the material which passes from said main bore into said exposing chamber;
   a main conveyor screw rotating in said main bore to propel the material from the first end of said main bore to the second end thereof;
   a returning conveyor screw rotating in said returning bore to return into said main bore the material received in said returning bore;
   a feed device to feed the material to be treated into the first end of said main bore while forming a substantially airtight seal between said first end and the outer atmosphere; and
   an outlet device to withdraw the treated material from the second end of said main bore while also forming a substantially airtight seal between said second end and the outer atmosphere.

2. In an apparatus as claimed in claim 1, said returning conveyor screw propelling the material being treated in the reverse direction with respect to said main conveyor screw so as to recycle said material from the second end of said main bore towards the first end thereof.

3. In an apparatus as claimed in claim 1, means to cool said exposing chamber so as to condense vapors evolved from the material being treated.

4. In an apparatus as claimed in claim 1, said body being formed with an inlet bore having a first end and a second end, with a material receiving inlet canal opening into said first end of said inlet bore, and with a connecting canal to connect said second end of said inlet bore with said first end of said main bore, and said inlet device being comprised of an inlet conveyor screw rotating in said inlet bore to propel the material to be treated from the first end to the second end of said inlet bore.

5. In an apparatus as claimed in claim 4, said inlet conveyor screw having an axial core and a helical thread supported thereby, said thread being of substantially constant pitch and having a substantially uniform outer diameter substantially equal to the diameter of said inlet bore, and said, axial core having a frustoconical diverging portion adjacent the second end of said inlet bore in such manner that the material propelled by said inlet conveyor screw may be progressively compressed in the form of a substantially airtight plug before reaching said connecting canal.

6. In an apparatus as claimed in claim 1, said body being formed with an outlet bore having a first end and a second end, with a material receiving canal connecting said second end of said main bore with said first end of said outlet bore, and said outlet device being comprised of an outlet conveyor screw rotating in said outlet bore to propel the treated material from said first end to said second end of said outlet bore.

7. In an apparatus as claimed in claim 6, said outlet conveyor screw having an axial core and a helical thread supported thereby, said thread being of substantially constant pitch and having a substantially uniform outer diameter substantially equal to the diameter of said outlet bore, and said axial core having a frustoconical portion adjacent the first end of said outlet bore, with said portion converging towards said second end of said outlet bore in such manner that the treated material forced into said first end of said outlet bore from said second end of said main bore may be compressed in said outlet bore in the form of a substantially airtight plug.

8. In an apparatus as claimed in claim 1, said main conveyor screw having an axial core and a helical thread supported thereby, said thread being of substantially constant pitch and having a substantially uniform outer diameter substantially equal to the diameter of said main bore, and said core of said main conveyor screw comprising a substantially cylindrical portion with an outwardly diverging portion adjacent said second end of said main bore.

9. In an apparatus as claimed in claim 1, said exposing chamber being in the form of an elongated bore communicating with said main bore and with said returning bore through a longitudinally extending lateral slot.

10. In an apparatus as claimed in claim 9, aid body being formed with a lip to prevent material propelled by said main screw from being thrown into said exposing chamber by said main conveyor screw under the action of centrifugal force.

11. In an apparatus as claimed in claim 10, said returning conveyor screw comprising a plain central portion having a diameter substantially equal to the diameter of said bore.

12. In an apparatus as claimed in claim 1, said exposing chamber being in the form of two separate spaces, each communicating with one of the ends of said main bore, and said body comprising means to circulate a gas between said separate spaces through said main bore.